United States Patent [19]

Bierschenk

[11] Patent Number: 4,743,419
[45] Date of Patent: May 10, 1988

[54] ON-LINE FILM FLUORINATION METHOD

[75] Inventor: Thomas R. Bierschenk, Round Rock, Tex.

[73] Assignee: The Dow Chemical Company, Midland, Mich.

[21] Appl. No.: 928,234

[22] Filed: Nov. 7, 1986

Related U.S. Application Data

[63] Continuation-in-part of Ser. No. 707,764, Mar. 4, 1985, abandoned.

[51] Int. Cl.⁴ .................. B29C 71/00; C08F 8/20; C08F 8/22; C08J 7/00
[52] U.S. Cl. ........................... 264/83; 34/12; 34/36; 34/37; 34/114; 34/115; 34/122; 118/718; 118/720; 118/721; 118/729; 118/730; 264/101; 264/211.13; 264/340; 425/73; 427/248.1; 427/255.1; 427/255.5; 525/355; 525/356
[58] Field of Search ............ 264/82, 83, 85, 101, 264/102, 211.12, 211.13, 340, 344; 427/248.1, 255.1, 255.5; 525/355, 356; 34/10, 12, 16, 23, 33, 36, 37, 114, 115, 116, 122; 425/73, 74, 75; 118/718, 720, 721, 729, 730

[56] References Cited

U.S. PATENT DOCUMENTS

| | | | |
|---|---|---|---|
| 2,497,046 | 2/1950 | Kropa | 264/83 X |
| 2,811,468 | 10/1957 | Joffre | 264/83 X |
| 3,061,882 | 11/1962 | Wolinski | 264/83 X |
| 3,512,265 | 5/1970 | Fleissner | 34/10 |
| 3,862,284 | 1/1975 | Dixon et al. | 264/83 |
| 4,296,151 | 10/1981 | Boultinghouse | 427/255.1 |

Primary Examiner—Jeffery Thurlow
Assistant Examiner—Leo B. Tentoni

[57] ABSTRACT

An on-line film fluorination apparatus cooperative with a continuous polymer film extruding apparatus is set forth. In the preferred and illustrated embodiment, a continuous feed film is introduced into a closed cabinet or housing having alignment and guide rollers for directing the film into the housing. The film passes around a first roller having a portion thereof formed of sintered nickel to enable gaseous impregnation of the surface of the film with a gas flow including fluorine. The gas acts on the exposed face of the film, changing the surface of the polymer film, thereby providing a relatively thick surface upgrading of the film. After exposure to the fluorine, the film passes a closed vacuum container having an open face adjacent to the film surface for drawing off unreacted fluorine for recapture and recycling. This procedure can be optionally repeated on both surfaces of the film; the film that emerges from the closed cabinet or housing has a modified surface, and the cabinet or housing is evacuated with slight negative pressure.

10 Claims, 1 Drawing Sheet

ON-LINE FILM FLUORINATION METHOD

This is a continuation-in-part of application Ser. No. 707,764 filed Mar. 4, 1985, and now abandoned.

BACKGROUND OF THE DISCLOSURE

This disclosure is directed to an apparatus and procedure for treatment of film emerging from a film forming device. The film is typically formed continuously and has a specified width. It is not uncommon to form film in the range of about six mils thick or less, typically from polymeric materials. A typical material is polyethylene which is formed into the film material. Obviously, alternate polymers or copolymer systems can be used to manufacture continuous output film supplied in specified width and thickness and which typically emerges from the machine at a specified rate or velocity.

U.S. Pat. No. 3,065,098 sets forth multiple rollers having perforations for undulating a web of material for drying. An alternate structure is a sieve drum set forth in U.S. Pat. No. 3,585,729. A suction draft accompanies the sieve drum. Moreover, U.S. Pat. No. 4,364,185 shows a rotating cylinder 12. Hot gas flowing at an exemplary rate of 5,000 cfm is described in conjunction with the rotating cylinder. It is submitted that the structures described above, representative of the prior art, do not set forth a method for achieving surface fluorination of polymer film. Even more remote are the procedures for fluorinating blow molding polymers as exemplified in U.S. Pat. No. 4,396,567; this is typically applying gas within a fabricated bottle, jug, etc.

This apparatus and procedure accomplishes a surface fluorination of a polymeric film. As will be understood, the extrusion fabrication procedure orients long polymer molecules lengthwise (with the extrusion direction) to thereby form the film. The physical or mechanical characteristics of the film are in large part determined by the particular polymer system utilized in fabrication of the film; this method and apparatus enables the film to be modified by application of fluorine to the surface, thereby achieving change in surface of the polymeric film. As will be understood, in a typical thin film (up to about six mils thickness), it is not necessary or desirable to accomplish fluorination fully through the extruded plastic mass. (Rather, fluorination of the polymer surface (or cross-linking) can be implemented at surface molecules.) Thus, a change in the skin properties and characteristics typically achieves significant physical property changes and thereby enables the film to obtain significant gains in mechanical characteristics for a relatively small cost increment. As an example, one should consider the relative cost per unit weight of low density polyethylene film in contrast with the cost of more sophisticated polymer or copolymer systems (e.g., fluorinated ethylene—propylene). A modification thus accomplishes substantial change in mechanical characteristics without the excessive cost that would be associated with more expensive fully fluorinated polymer or copolymer systems. Moreover, the method of manufacture of low density polyethylene entails a less costly and less difficult manufacturing process.

Many products operate quite satisfactorily with only a surface treatment. For instance, surface treatment by the procedure described hereinbelow changes the wettability of polyethylene film. There is no need to extend the fluorination treatment into the film because this is primarily a surface treatment, and many uses and applications are available for a low density polyethylene film having improved surface wettability characteristics.

With the foregoing in view, this apparatus and procedure are summaried as a method of modification of the surface of a continuously extruded film wherein the film from a film forming device is directed through a closed cabinet or housing evacuated by means of modest vacuum flow. Within the housing, there are guide rollers for directing the film around a roll. The roll is preferably formed of a sintered metal and a gas flow (a mixture of elemental fluorine and nitrogen for dilution) is directed into the roll. It flows through the roll to impinge on the surface of the film moving therepast. Moreover, the film is looped around the roll within a closed cabinet or housing which is connected with an exhaust pump to remove surplus fluorine. As desired, the equipment can be duplicated for fluorination of both sides of the extruded film. The film extends from this device to a suitable tensioning device which draws the film through the system for subsequent use or spooling.

A gas distribution system is included which mixes fluorine and nitrogen and supplies the gas through a regulator. It is delivered to the sintered roll, at a slight positive pressure. The exposure time of the film in the housing is sufficient to accomplish fluorination.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
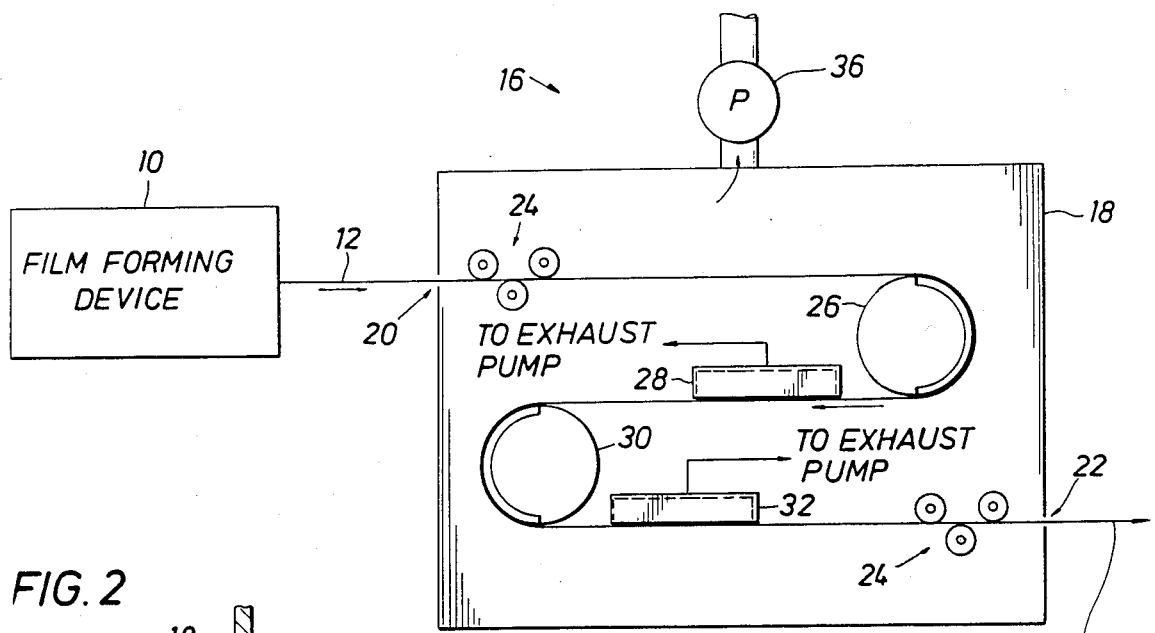
FIG. 1 is a side view of a film delivery system providing polymeric film to an on-line fluorination apparatus in accordance with the teachings of this disclosure for applying fluorine to both sides of an extruded film strip.

Attention is first directed to FIG. 1 of the drawings. In FIG. 1 the numeral 10 identifies a film forming device which provides a continuous web or ribbon of film 12. The film is formed of a suitable polymer or copolymer system. It is extruded to a specified width depending on the physical dimensions of the film forming device. Moreover, it is extruded to a specified thickness. Typical thicknesses range up to about four to about six mils; moreover, the film is extruded at a specified linear velocity such as fabrication of film at the rate of 50 to 500 feet per minute (25.4 to 254 cm per second). The rate can be as slow as 5 feet/minute in selected situations, e.g., where gas concentration is reduced. In general terms, however, the rate yielding greater output is increased to something closer to 50 feet/minute or so. In general terms, the film surface contact with the fluorine gas acts on the surface molecules to achieve physical property change. Obviously, the measurements given herein regarding width, thickness and linear velocity are representative. They are sized to provide a specified fluorine exposure time to accomplish surface conversion as will be described. The film is delivered in a completely cured state from the film forming device 10. That is, the film is cured in the sense that the polymerization reaction has been completed before film extrusion and fluorination and the surface is not so tacky as to prevent handling by machine. The film is then delivered to an on-line apparatus 16. It includes a closed housing or cabinet 18 formed with suitable closed walls. Film is admitted to the housing 18 at an inlet slot 20 and emerges from an outlet slot 22. The slots 20 and 22 are similar in construction and differ primarily in their use. Moreover, the slots are sized and located to permit alignment of the film with the film forming device 10 and a tension device (not shown) which is connected downstream to take up the fabricated film and spool the film or to otherwise deliver it for subsequent conversion.

The film 12 thus has a specified width, thickness and velocity. It is input through a set of alignment or guide rollers 24 and also duplicated at the outlet slot 22. The rollers 24 direct the film on entrance through the slot 20. The film is directed to a roll 26. The roll 26 is an elongate hollow tube of circular cross-section formed of sintered nickel. One roll source is Mott Metallurgical, and other sources can likewise be obtained for the roll 26. It is of circular cross-section, formed of sintered material, to thereby enable gas to percolate through the roll. It has an outer surface wherein the film 12 loops around it. In theory, the film contacts the surface at about 180° of the roll. Variation from this is no particular problem. The routing of the film is such that one face of the film contacts against the roll, loops partly around it, and is thus exposed to gas delivered from the sintered roll 26. That will be described in detail hereinafter. Within the housing 18, there is a transverse rectangular hood 28. The hood 28 is open across the bottom and the film 12 is routed across the bottom. The hood is immediately adjacent to the film as it emerges from the roll 26. The hood 28 is connected with an exhaust pump which pulls a vacuum of modest measure, thereby exhausting any free fluorine gas on the surface of the film.

The film is next directed to a second roll 30. The roll 30 is positioned and located so that it contacts the remaining face of the film. Recall that the roll 26 is exposed to the first face of the film. The roll 30 contacts against the second face of the film. The two rolls together thus expose both faces of the film to a flow of fluorine gas. In like fashion, after the film loops around the roll 30, the film is then directed to and past a second hood 32 which functions similar to the first hood to remove surplus elemental fluorine. This hood also spans the full width of the equipment and thereby removes fluorine gas, the gas being removed through an exhaust pump.

The two rollers and the two hoods collaborate to first apply and then remove surplus fluorine gas. As will be understood, the two rolls are provided with a gas flow of dilute fluorine. A typical supply of fluorine is between about 0.5 to about 5% fluorine with nitrogen. The nitrogen provides dilution so that excessive fluorine is not released and thereby wasted. The two rolls are thus applicators which deliver the fluorine-nitrogen gas mixture against the film for conversion of the film by reacting the fluorine with the film material. The fluorine concentration and film exposure time jointly assure adequate exposure and hence adequate surface conversion.

The housing 18 is a closed chamber. It has a pump 36 connected to it to evacuate the housing 18. Assume that the pump 36 removes a sufficient air flow to provide a negative pressure of about 0.5 psi. This prevents the escape of fluorine to the exterior. Moreover, any air flow through the slots 20 and 22 is into the housing 18 for evacuation through the exhaust pump 36. This protects workers in the nearby vicinity.

Figure 2:
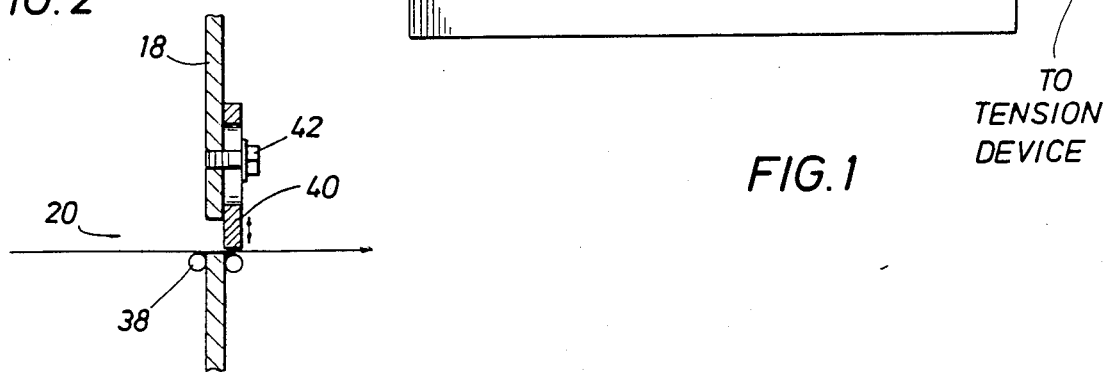
FIG. 2 is an enlarged detail view of an inlet and outlet slots in the cabinet or housing of the structure shown in FIG. 1 to minimize the escape of fluorine gas to atmosphere.

The slots 20 and 22 are relatively narrow. They are preferably selectively closed almost to the point of pinching the material in the web 12. The slots can be lined with Teflon film in the form of a bead. In FIG. 2, the slots 20 and 22 are thus defined by beading material 38 which closes over one edge and wraps around it in the fashion of a U-shaped channel to protect against snagging the film, and to also provide a seal which reduces leakage. The slot is narrowed selectively; as an example, TEFLON film or a cloth of woven TEFLON fibers, is used to provided a hanging skirt or apron 40. The mark TEFLON is a trademark of the DuPont Company and identifies a specific form of fluoropolymer. The skirt or apron is raised or lowered and is clamped in place by means of a large head on a bolt 42. The TEFLON film 40 is slotted beneath the head so that it can be raised or lowered and is then clamped in position by tightening the bolt 42.

As will be observed in FIG. 2, the skirt 40 can be raised and lowered. Whether raised or lowered, it controllably narrows the gap in the slot. This permits selective and careful adjustment to accommodate different thicknesses of film. Moreover, the slot is then defined by resilient members of a relatively slick surface to avoid snagging. This permits closing so that the particular film thickness can be accommodated at the slot. Changes in film thickness thus are easily adjusted by moving the skirt.

The foregoing is accomplished at both the slots 20 and 22 by duplicating the equipment shown in FIG. 2 at both slots. This permits the cabinet or housing 18 to enclose a substantially isolated air space, thereby reducing the exposure of workman in the vicinity to fluorine escaping from the cabinet or housing.

Figure 3:
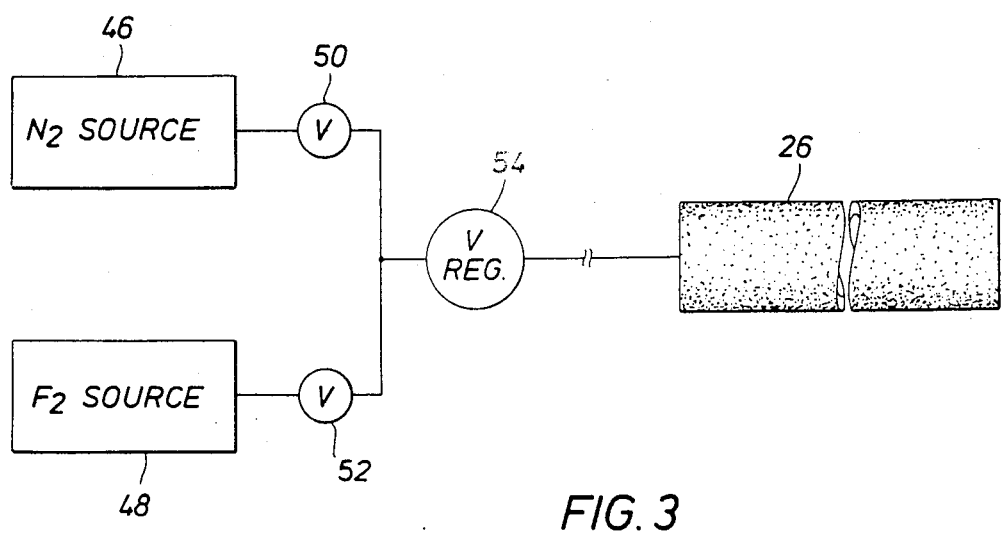
FIG. 3 is a gas supply system for use with the present apparatus.

Attention is now directed to FIG. 3 of the drawings. There, a nitrogen gas source is indicated at 46 and a similar container 48 provides fluorine. Each is connected through a supply valve, the valves being identified at 50 and 52. They connect through a pressure regulator 54. The regulator connects through a suitable flow line to the roll 26, or in the event that two rolls are used, then to the roll 30 also. Both rolls are utilized to treat both faces or surfaces of the film.

The rolls are fabricated typically with a porous wall encircling 360° of each roll. To the extent that it is not necessary to deliver gas through the full 360° surface of the rolls, certain portions of the rolls can be blanked off. For instance, commercially available air film rolls can be provided which has a portion of the roll masked off with non-porous nickel (Mott metallurgical).

In operation, film is delivered to the apparatus shown in FIG. 1. The film is routed through the housing 18 in the fashion shown in FIG. 1 to expose both spaces or surfaces of the web 12 to fluorine. The fluorine is delivered under a slightly positive pressure. As an example, the regulator 54 is adjusted to about 1–10 psi greater than the pressure within the cabinet 18. Assuming that the exhaust pump 36 reduces the pressure in the cabinet 18 by about 0.5 psi (3.4 kPa), the two hoods 28 and 32 are operated at about 1 psi less to assure that the fluorine gas is removed by a suitable vacuum handling system. The fluorine is highly desirable for reaction with the surface of the polymeric film making up the web 12 but it is something of a danger if it escapes from the housing 18. Thus, the film is confined within the housing 18 to pass adjacent to the hoods 28 and 32 in such a fashion as to provide two opportunities to remove the free or unreacted fluorine gas. To the degree that other fluorine reactions occur, such reactants are also removed. For instance, the fluorine may well react with water in the atmosphere to form hydrofluoric acid in sufficient quantities to give some cause for concern. Whatever the case, the hood and evacuation system shown in the drawings is sufficient to make the work environment relatively safe. Actual film exposure time is a function of film velocity and cabinet or housing dimensions. In general terms, the first and strongest exposure is at the rollers 26 and 30. The fluorine in the atmosphere and at the film surface persists for an interval. The surplus gas is pulled by the exhaust system away from the area after a significant amount of fluorination has occurred at or near the surface of the film. The film velocity is preferably about 50 to about 500 feet per minute. This housing size can be varied over a range including very large housings. The preferred housing size in conjunction with the film velocity yields an exposure time potentially over a wide range. Assuming room temperatures of perhaps 50° to 90° F., and a 5% fluorine concentration, the film exposure time preferably exceeds about 0.1 second at the roller. The preferred total film exposure time (for each side separately) is in the range of about 0.2 to 2.0 seconds at this concentration.

The reacted fluorine enters into the film and accomplishes changes in the surface of the film, particularly yielding improved physical or strength characteristics. This enables the film to be used for alternate applications without extraordinary cost increments as would occur with other products.

While the foregoing is directed to the preferred embodiment of the present invention, other and further embodiments of the invention may be devised without departing from the basic invention thereof, and the scope thereof is determined by the claims which follow.

What is claimed is:

1. A method of fluorination of a continuous extruded polyethylene film having at least a specified width comprising the steps of:
   (a) continuously feeding the polyethylene film after formation along a fixed path wherein the film is deployed to a specified width and travels along such a path;
   (b) passing the film around a pervious means comprising a curving film contact surface and the film wraps at least partially therearound; and the surface spans the width of the film;
   (c) injecting under positive pressure a flow of gas including gaseous fluorine mixed with an inert gas through said pervious means to impinge on the surface of the film to fluorinate the film to thereby change the surface characteristics of the film;
   (d) moving the film past said pervious means in the presence of a continuous flow of fluorine to thereby treat a specified length of film;
   (e) wherein the step of exposing said film to fluorine occurs in an isolated atmosphere subject to evacuation of surplus fluorine or fluorine compounds from the isolated atmosphere; and
   (f) the film is exposed to fluorine for a time at least about 0.1 second up to about 2.0 seconds.

2. The method of claim 1 wherein said film is exposed to fluorine in an isolated atmosphere maintained under a slightly negative pressure by a vacuum means for evacuation of surplus fluorine or fluorine compounds formed in that atmosphere.

3. The method of claim 1 wherein the film has two sides and fluorine gas is applied in a first step to a first side thereof, and including the subsequent step of passing the second side of the film adjacent to a second pervious means having fluorine gas passing therethrough wherein the fluorine gas impinges on the second side of the film.

4. The method of claim 3 wherein said film is extruded into a closed container having a pair of slits therein, and said film is directed into the closed container through a first slit and emerges therefrom through a second slit.

5. The method of claim 1 wherein the fluorine gas is diluted with nitrogen.

6. The method of claim 1 wherein said pervious means is a sintered roller.

7. The method of claim 1 wherein said pervious means passes fluorine gas therethrough.

8. The method of claim 1 wherein the fluorine crosslinks with polyethylene polymers to modify the surface of the film.

9. The method of claim 4 wherein film is first extruded and then travels along a fixed path through a set of alignment rollers and is directed into a slit for entry into a closed container surrounding said pervious means, and further including the step of controlling tension in the moving film.

10. The method of claim 1, wherein:
   (a) the film has two sides and fluorine gas is applied in a first step to a first side thereof;
   (b) passing the second side of the film adjacent to a second pervious means having fluorine gas passing therethrough wherein the fluorine gas impinges on the second side of the film;
   (c) wherein said film is extruded into a closed container having a pair of slits therein, and said film is directed into the closed container through a first slit and emerges therefrom through a second slit;
   (d) wherein film after extrusion travels along a fixed path through a set of alignment rollers and is directed into a slit for entry into a closed container surrounding said pervious means; and
   (e) controlling tension in the moving film.

* * * * *